(12) United States Patent
Gibson et al.

(10) Patent No.: US 8,714,919 B2
(45) Date of Patent: May 6, 2014

(54) INLET AND EXHAUST SYSTEM

(75) Inventors: Michael E. Gibson, Greenwood, IN (US); James T. Erdmann, Indianapolis, IN (US)

(73) Assignee: Raytheon Company, Waltham, MA (US)

( * ) Notice: Subject to any disclaimer, the term of this patent is extended or adjusted under 35 U.S.C. 154(b) by 921 days.

(21) Appl. No.: 12/614,161

(22) Filed: Nov. 6, 2009

(65) Prior Publication Data

US 2011/0110776 A1     May 12, 2011

(51) Int. Cl.
    *F02K 1/00* (2006.01)
(52) U.S. Cl.
    USPC ......... 415/184; 415/185; 415/212.1; 415/220
(58) Field of Classification Search
    USPC ........... 415/182.1, 183, 184, 185, 207, 212.1, 415/218.1, 220, 223, 224, 225, 226, 227, 415/913; 60/226.1, 262, 767, 770
    See application file for complete search history.

(56) References Cited

U.S. PATENT DOCUMENTS

| | | | | |
|---|---|---|---|---|
| 3,191,886 A * | 6/1965 | Lewis et al. | ................. | 244/23 R |
| 3,266,245 A * | 8/1966 | Mullins | ........................ | 60/226.1 |
| 3,310,951 A * | 3/1967 | Marchant | ........................ | 60/771 |
| 3,669,385 A * | 6/1972 | Glantz et al. | .................... | 244/13 |
| 3,684,054 A | 8/1972 | Lemmerman | | |
| 3,690,102 A | 9/1972 | DuPont | | |
| 3,752,422 A | 8/1973 | Runnels et al. | | |
| 3,818,700 A | 6/1974 | Kantrowitz et al. | | |
| 4,228,652 A | 10/1980 | Short | | |
| 4,369,940 A * | 1/1983 | Kelly et al. | .................. | 244/3.21 |
| 4,543,785 A | 10/1985 | Patrick | | |
| 4,865,267 A | 9/1989 | Severson | | |
| 4,938,021 A * | 7/1990 | Jones et al. | ..................... | 60/263 |
| 5,161,369 A * | 11/1992 | Williams | ..................... | 60/226.1 |
| 5,483,791 A * | 1/1996 | Kotwal et al. | .................. | 60/796 |
| 5,826,794 A | 10/1998 | Rudolph | | |
| 6,990,798 B2 | 1/2006 | Bouchard et al. | | |
| 7,134,271 B2 * | 11/2006 | Baughman et al. | .......... | 60/226.1 |
| 7,222,819 B1 | 5/2007 | Kelnhofer | | |
| 2008/0134665 A1 * | 6/2008 | Birch et al. | .................. | 60/226.3 |

* cited by examiner

*Primary Examiner* — Edward Look
*Assistant Examiner* — Jesse Prager

(57) ABSTRACT

According to one embodiment, an inlet system comprises first and second incoming fluid ducts configured to be disposed outside of a vessel and to receive a first incoming fluid stream in a first direction through the first incoming fluid duct and a second fluid stream through the second incoming fluid duct in a second direction substantially parallel to the first direction. An internal fluid duct is configured to be disposed inside the vessel and to discharge internal fluid from the first and second incoming fluid streams in a third direction within the vessel substantially parallel to the first and second directions. The inlet system also comprises first and second fluid channels coupling the first and second incoming fluid ducts outside the vessel to the first internal fluid duct such that the first and second incoming fluid streams are communicated to the first internal fluid duct.

23 Claims, 8 Drawing Sheets

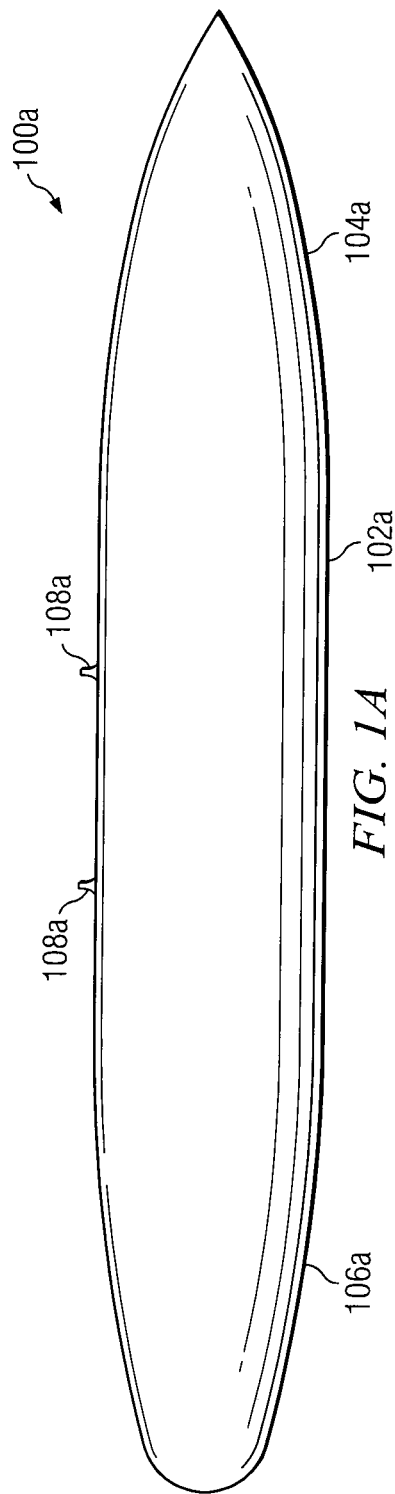
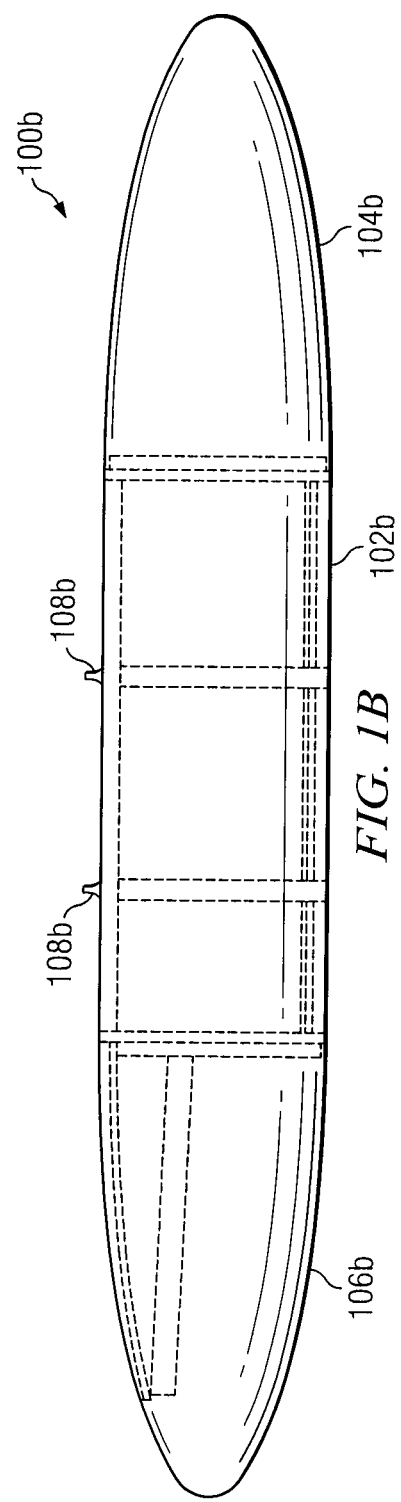
FIG. 1A
FIG. 1B

INLET AND EXHAUST SYSTEM

GOVERNMENT RIGHTS

This invention was made with government support under government contract number N00019-09-C-0085 NGJ BAA Tasks. The Government has certain rights in this invention.

TECHNICAL FIELD

This invention relates generally to the field of fluid mechanics and more specifically to inlet and exhaust systems.

BACKGROUND

A variety of mechanical devices, such as engines, turbines, generators, compressors, and pumps, extract energy from or impart energy on a fluid. These devices may include fluid inlet and exhaust systems. In some deployments, inlet and exhaust systems may affect overall device performance.

SUMMARY OF THE DISCLOSURE

According to one embodiment, an inlet system comprises first and second incoming fluid ducts configured to be disposed outside of a vessel and to receive a first incoming fluid stream in a first direction through the first incoming fluid duct and a second fluid stream through the second incoming fluid duct in a second direction substantially parallel to the first direction. An internal fluid duct is configured to be disposed inside the vessel and to discharge internal fluid from the first and second incoming fluid streams in a third direction within the vessel substantially parallel to the first and second directions. The inlet system also comprises first and second fluid channels coupling the first and second incoming fluid ducts outside the vessel to the first internal fluid duct such that the first and second incoming fluid streams are communicated to the first internal fluid duct.

Certain embodiments of the invention may provide one or more technical advantages. A technical advantage of one embodiment may include the capability to reduce drag over a vessel caused by inlets and exhausts coupled to the vessel. A technical advantage of one embodiment may also include the capability to reduce pressure loss and maximize ram recovery in a ducted inlet. A technical advantage of one embodiment may also include the capability to minimize duct volume within a vessel.

Various embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIGS. 1A, 1B, and 1C show example vessel embodiments.

DETAILED DESCRIPTION OF THE DRAWINGS

It should be understood at the outset that, although example implementations of embodiments of the invention are illustrated below, the present invention may be implemented using any number of techniques, whether currently known or not. The present invention should in no way be limited to the example implementations, drawings, and techniques illustrated below. Additionally, the drawings are not necessarily drawn to scale.

Teachings of certain embodiments recognize that inlet and exhaust systems may be used to communicate fluid to and from a mechanical device housed or supported within a vessel. Mechanical devices may include, but are not limited to, engines, turbines, generators, compressors, and pumps. A vessel may include any suitable open or closed structure for housing and/or supporting a mechanical device.

Figure 1C:
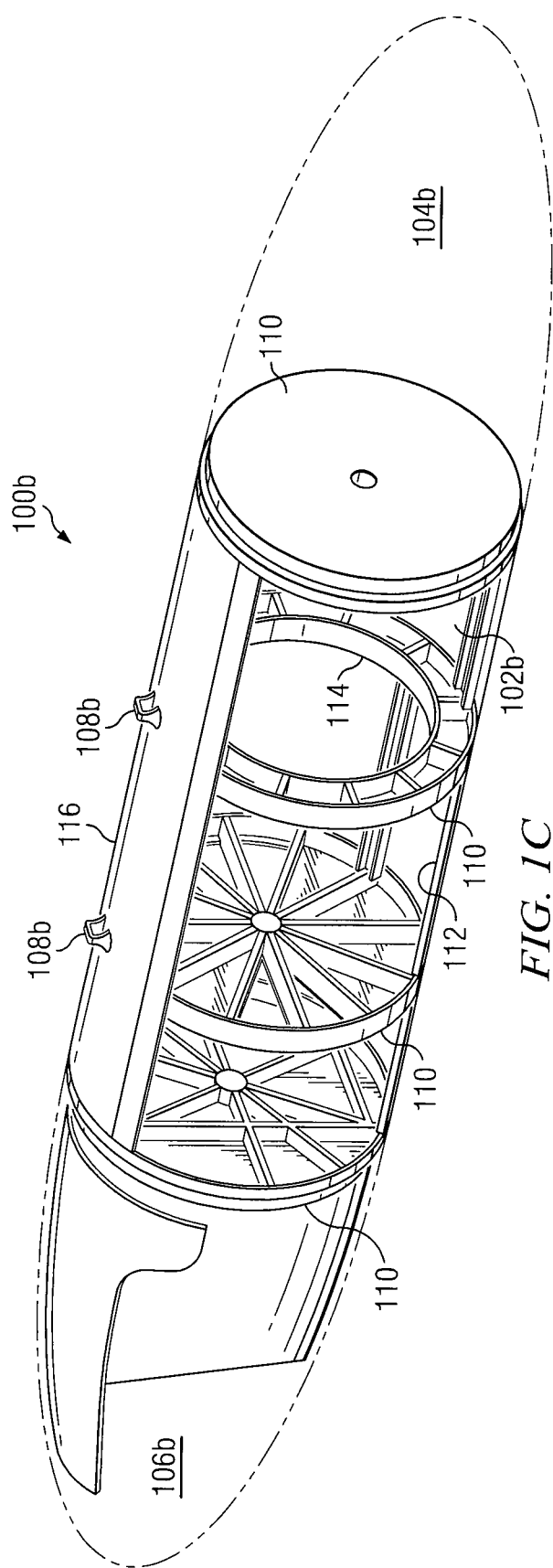

FIGS. 1A, 1B, and 1C show example vessel embodiments. However, teachings recognize that any suitable vessel may be used.

FIG. 1A shows a vessel 100a according to one example embodiment. Vessel 100a features a body 102a, a forward capsule 104a, an aft capsule 106a, and attachment points 108a. In this example embodiment, vessel 100a is a 480 gallon, ogive-shaped tank: the body 102a has a cylindrical shape with circular cross-sectional area, and the capsules 104a and 106a are non-symmetric. In this example, the body 102a and the capsules 104a and 106a share an open body cavity (not shown). Attachment points 108a are one example mechanism for attaching the vessel 100a to a secondary structure. For example, in one embodiment, the vessel 100a may be secured to an aircraft wing at the attachment points 108a.

FIG. 1B shows a vessel 100b according to one example embodiment. Vessel 100b features a body 102b, a forward capsule 104b, an aft capsule 106b, and attachment points 108b. In this example embodiment, Vessel 100b is a 480 gallon, elliptical-shaped tank: the body 102b is cylindrical shape with constant circular cross-sectional area, and the capsules 104b and 106b are elliptically-shaped and symmetric. In this example, the body 102b and the capsules 104b and 106b share an open body cavity (shown in FIG. 1C). Attachment points 108b are one example mechanism for attaching the vessel 100b to a secondary structure. For example, in one embodiment, the vessel 100b may be secured to an aircraft wing at the attachment points 108b.

FIG. 1C shows an interior view of the vessel 100b of FIG. 1B according to one example embodiment. The vessel 100b of FIG. 1C features bulkheads 110, longerons 112, a support structure 114 built within the bulkhead 110, and a strongback 116. In some embodiments, the bulkheads 110 and longerons 112 may provide an internal support structure for the vessel 100b. For example, bulkheads 110 may provide radial support, longerons 112 may provide axial support. The support structure 114 may include any structure suitable for supporting a mechanical device. For example, teachings of certain embodiments recognize a thicker support structure 114 for larger mechanical devices. In this example embodiment, the attachment points 108b and the bulkheads 110 are secured to the strongback 116. Teachings of certain embodiments recognize that the strongback 116 may improve strength of the vessel 100b by distributing forces from the attachment points 108b across multiple bulkheads 110.

Figure 2A:
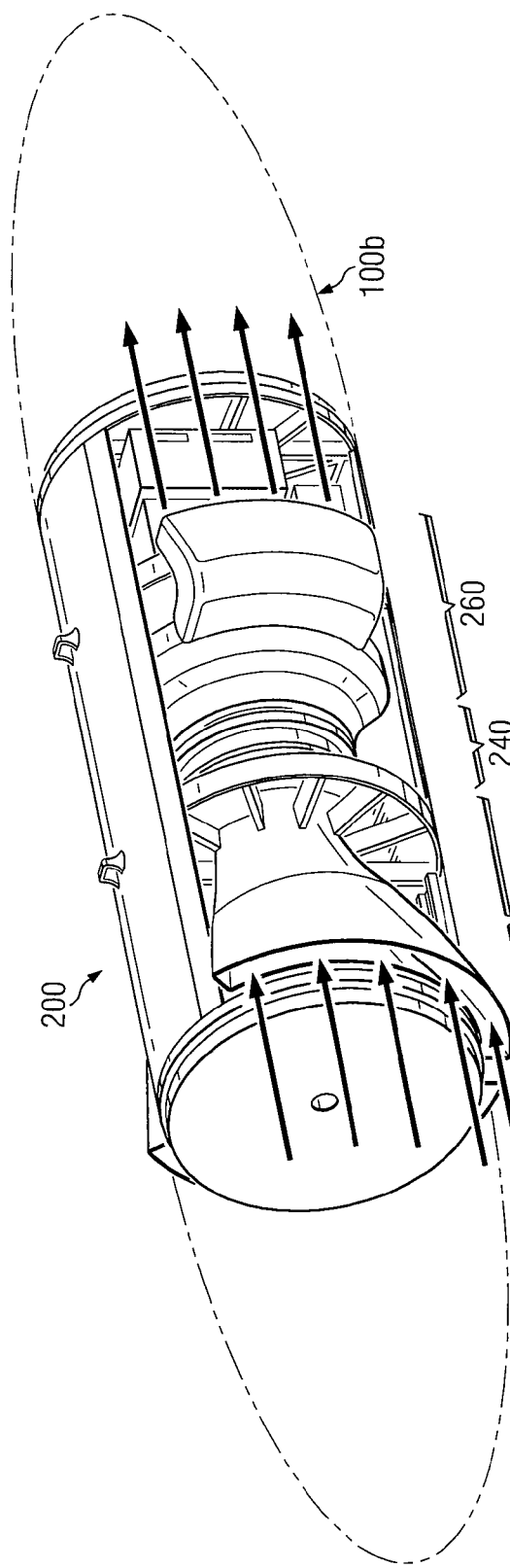
FIGS. 2A-2F shows an inlet/exhaust system according to one example embodiment.
Figure 2B:
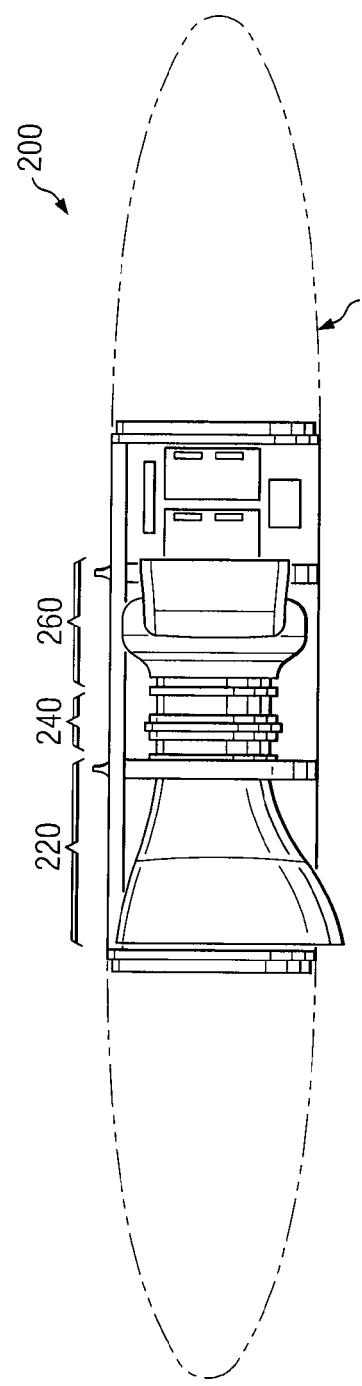
Figure 2C:
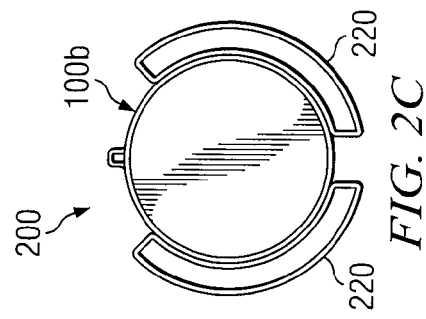
Figure 2D:
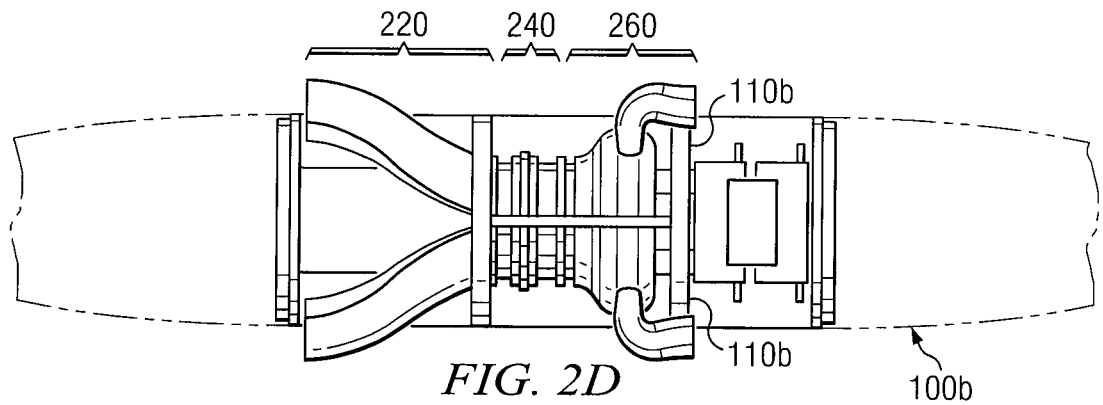
Figure 2E:
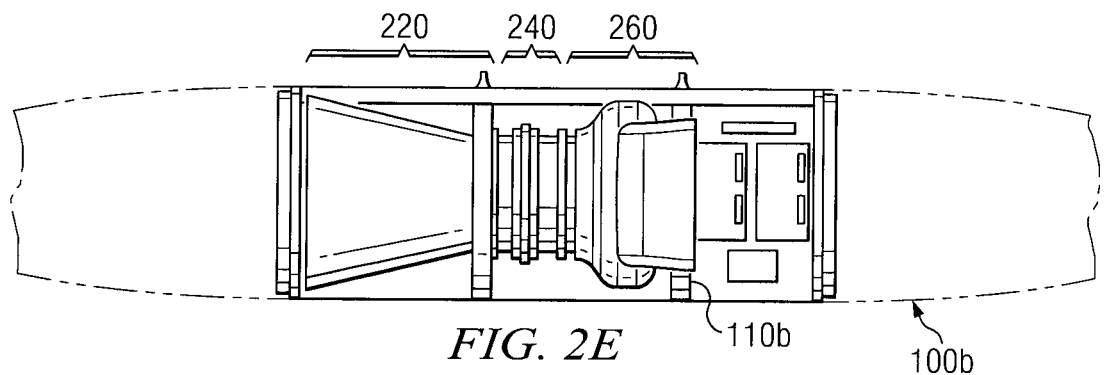
Figure 2F:
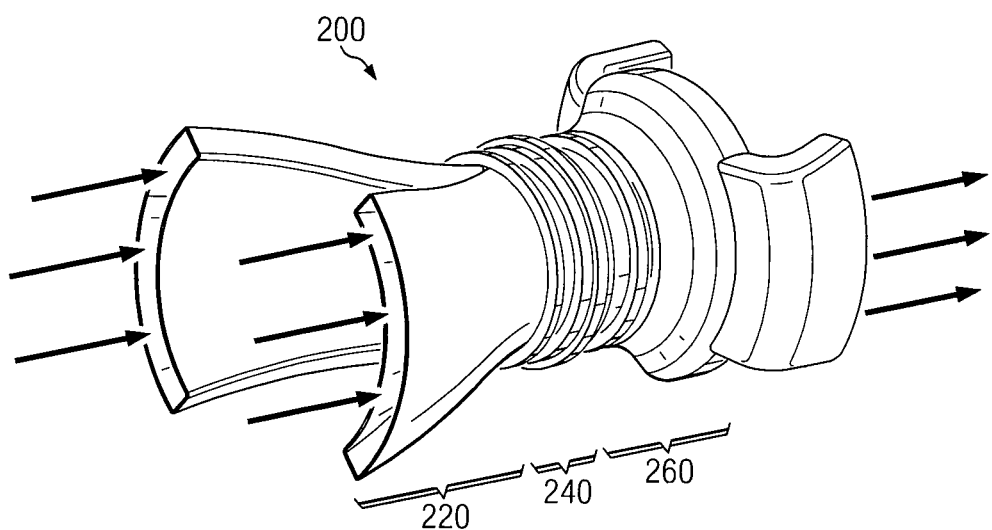

FIGS. 2A-2F shows an inlet/exhaust system 200 according to one example embodiment. FIGS. 2A, 2B, and 2C show the inlet/exhaust system 200 with the vessel 100b of FIGS. 1B and 1C; however, teachings of certain embodiments recognize that any suitable vessel may be used. FIG. 2A shows a perspective interior view of the inlet/exhaust system 200 with vessel 100b, FIG. 2B shows a side interior view of the inlet/exhaust system 200 with vessel 100b, and FIG. 2C shows a front exterior view of the inlet/exhaust system 200 with vessel 100b. FIGS. 2D and 2E show the inlet/exhaust system 200 and the vessel 100b with the capsules 104b and 106b removed. FIG. 2D shows a bottom interior view, and FIG. 2E shows a side interior view. FIG. 2F shows a perspective view of the inlet/exhaust system 200 with the vessel 100b removed.

In this example embodiment, inlet/exhaust system 200 features an inlet system 220, a mechanical device 240, and an exhaust system 260. In this example, mechanical device 240 a Turbine; however, teachings of certain embodiments recognize that any suitable mechanical device may be used. In this example embodiment, the inlet system 220 may direct fluid outside the vessel 100b to the mechanical device 240, and the exhaust system 260 may direct fluid from the mechanical device 240 to outside the vessel 100b. Example inlet systems 220 and exhaust systems 260 will be described in greater detail with respect to FIGS. 3A-5D.

In one example embodiment, the inlet/exhaust system 200 and vessel 100b are located in an ambient fluid flow, as shown in FIG. 2A. In the shown example, the ambient fluid flow may represent an ambient air flow. In this example embodiment, the ambient fluid flow is traveling in a first direction relative to the vessel 100b, and the inlet system 220 may direct fluid from the ambient fluid flow outside the vessel 100b to the mechanical device 240 in the vessel 100b. This first direction may be substantially perpendicular to the cross-sectional plane of the vessel 100b and/or the openings of the inlet system 220. As used throughout, substantially perpendicular and substantially parallel may include any direction that is generally perpendicular or parallel. Thus, the terms perpendicular and parallel are not limited to strict mathematical definitions, such as an angular definition.

As shown in the embodiments of FIGS. 2A-2C, the openings of the inlet system 220 may or may not be flush with the outer surface of the vessel 100b. For example, the openings may protrude out of the vessel 100b and are perpendicular to the outer surface of the vessel 100b. However, in some embodiments, the openings of the inlet system 200 may be flush with the outer surface of the vessel 100b. In yet other embodiments, openings of the inlet system 220 may be retractable.

The exhaust system 260 may direct fluid flow from the mechanical device 240 to outside the vessel 100b such that the fluid rejoins the ambient fluid flow. In some embodiments, the exhaust system 260 may direct the fluid in a direction substantially parallel with the ambient fluid flow. As shown in the embodiments of FIGS. 2A-2C, the openings of the exhaust system 260 may not be flush with the outer surface of the vessel 100b; for example, the openings may protrude out of the vessel 100b and are perpendicular to the outer surface of the vessel 100b. However, in some embodiments, the openings of the exhaust system 260 may be flush with the outer surface of the vessel 100b.

Figure 3A:
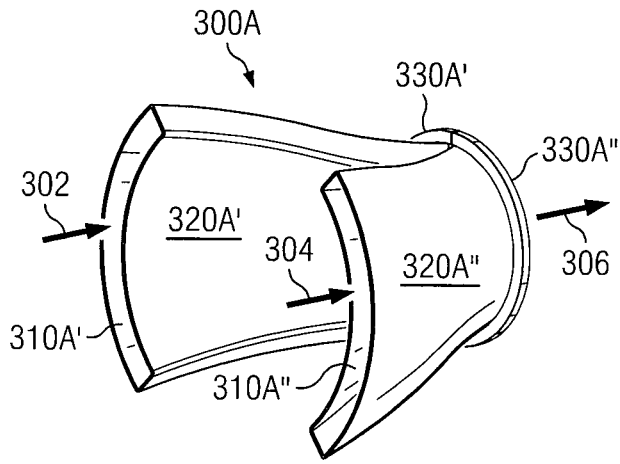
FIGS. 3A, 3B, 3C, and 3D show inlet systems according to several embodiments.
Figure 3B:
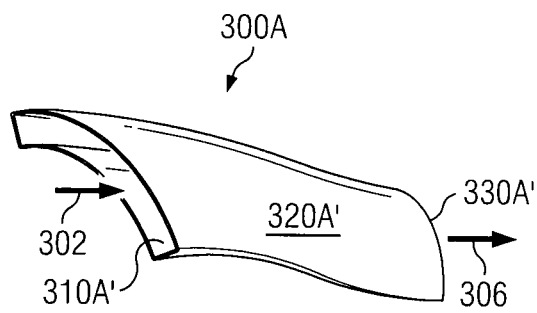
Figure 3C:
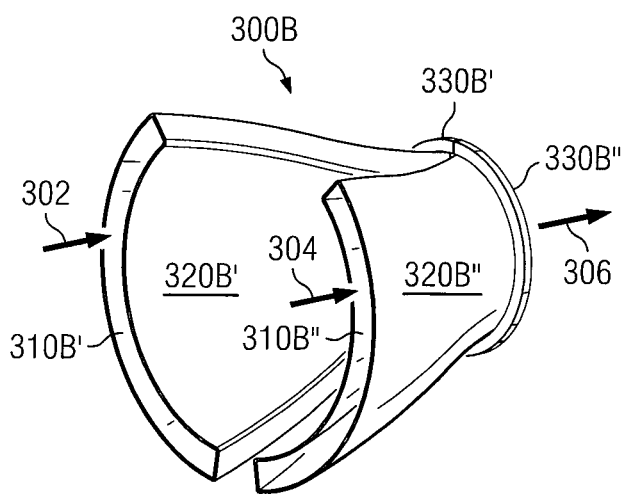
Figure 3D:
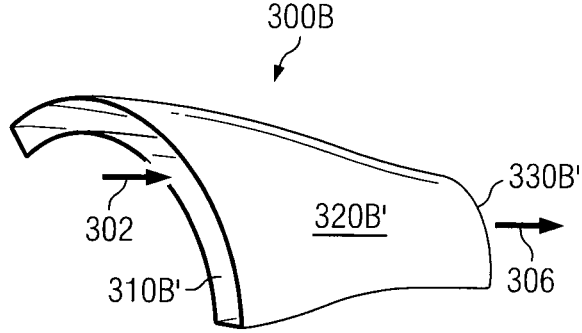

FIGS. 3A, 3B, 3C, and 3D show inlet systems 300A and 300B according to several embodiments. FIGS. 3A and 3B show inlet system 300A, and FIGS. 3C and 3D show inlet system 300B. FIGS. 3A and 3C show full perspective views of inlet systems 300A and 300B, respectively, and FIGS. 3B and 3D show half symmetry perspective views of inlet systems 300A and 300B, respectively.

Inlet system 300A features a first incoming fluid duct 310A', a second incoming fluid duct 310A", a first fluid channel 320A', a second fluid channel 320A", a first outgoing fluid duct 330A', and a second outgoing fluid duct 330A". In some embodiments, the first incoming fluid duct 310A' may be configured to receive a first incoming fluid stream 302 traveling in a first direction, and the second incoming fluid duct 310A" may be configured to receive a second incoming fluid stream 304 traveling in a second direction substantially parallel to the first direction. First fluid channel 320A' and second fluid channel 320A" may be coupled to the first and second incoming fluid ducts 310A' and 310A", respectively, and be configured to communicate fluid from the first and second incoming fluid ducts 310A' and 310A" to the first and second outgoing fluid ducts 330A' and 330A", respectively. In some embodiments, the outgoing fluid ducts 330A' and 330A" may discharge fluid in a third direction substantially parallel to the first and second directions.

Teachings of certain embodiments recognize that the inlet system 300A may reduce distortion of the incoming fluid and differences in pressure over the length of the inlet system 300A. Teachings of certain embodiments also recognize that the inlet system 300A may facilitate efficient packing of devices and equipment within a vessel, such as the vessels 100a and 100b.

Teachings of certain embodiments also recognize that individual components of the inlet system 300A may be sized to optimize fluid intake volume, pressure changes, and other performance characteristics for a specific deployment of an inlet system. For example, inlet system 300B features a first incoming fluid duct 310B', a second incoming fluid duct 310B", a first fluid channel 320B', a second fluid channel 320B", a first outgoing fluid duct 330B', and a second outgoing fluid duct 330B". In this example, inlet system 300B features larger incoming fluid ducts 310B' and 310B" than the incoming fluid ducts 310A' and 310A" of inlet system 300A. Teachings of certain embodiments recognize that incoming fluid duct size may be modified based on performance characteristics of a mechanical device, such as the mechanical device 240, as well as other performance characteristics.

In another example, the fluid channels 320A', 320A", 320B', and 320B" may be shaped according to a spline curve. Teachings of certain embodiments recognize that shaping the fluid channels according to a spline curve may improve inlet system performance. For example, in one embodiment, a spline curve may be used to reduce or increase pressure drop over the length of the inlet system.

Figure 4A:
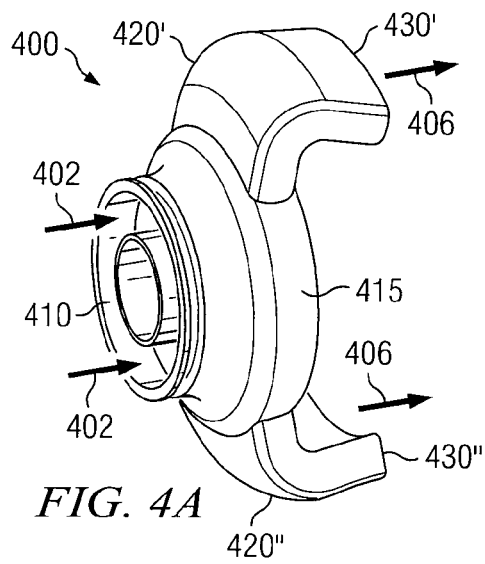
FIGS. 4A, 4B, and 4C show an exhaust system according to one embodiment.
Figure 4B:
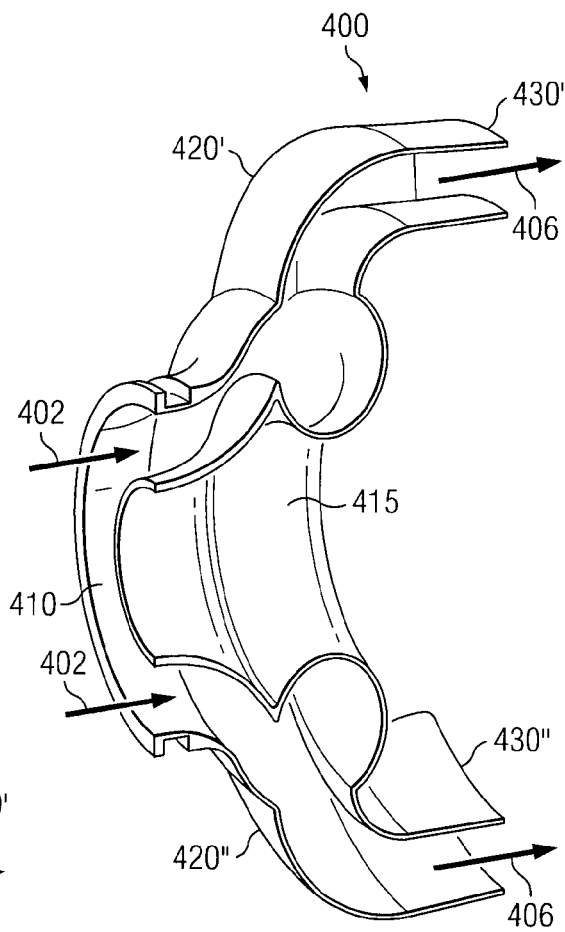
Figure 4C:
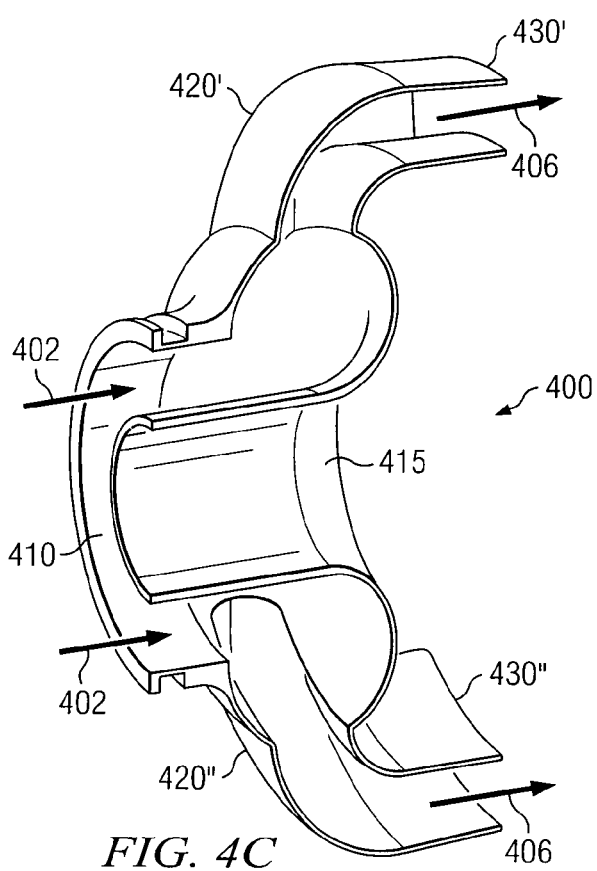

FIGS. 4A, 4B, and 4C show an exhaust system 400 according to one embodiment. Exhaust system 400 features an incoming fluid duct 410, a first fluid channel 420', a second fluid channel 420", a first outgoing fluid duct 430', and a second outgoing fluid duct 430". In some embodiments, the incoming fluid duct 410 may be configured to receive a first incoming fluid stream 402 traveling in a first direction. First fluid channel 420' and second fluid channel 420" may be configured to communicate fluid from the first incoming fluid duct 410 to the outgoing fluid ducts 430' and 430", respectively. In some embodiments, the outgoing fluid ducts may discharge fluid 406 in a direction substantially parallel to the first direction.

In some embodiments, the exhaust system 400 features a collector 415 coupled to the incoming fluid duct and the outgoing fluid ducts 430' and 430". FIGS. 4B and 4C show two example cross-sectional symmetric embodiments of the collector 415 exhaust system. FIG. 4B shows a ramped lobe radial exhaust, and FIG. 4C shows an axial lobe radial exhaust. In FIG. 4B, the collector 415 is configured to rotate fluid circumferentially around the collector 415 in a direction perpendicular to the incoming fluid flow, thus increasing the angular momentum of the fluid. In FIG. 4C, the collector is configured to rotate fluid by receiving incoming fluid flow in a first direction and turning the fluid back in a second direction opposite the first direction, thus creating a rotational vortex within the collector 415.

Teachings of certain embodiments recognize that the collector 415 may provide a compact mechanism for exhausting high-velocity, low-back pressure fluid. Teachings of certain embodiments recognize that the collector 415 may facilitate efficient packing of devices and equipment within a vessel, such as the vessels 100*a* and 100*b*.

In another example, the fluid channels 420' and 420" may be shaped according to a spline curve. Teachings of certain embodiments recognize that shaping the fluid channels according to a spline curve may improve exhaust system performance. For example, in one embodiment, a spline curve may be used to reduce or increase pressure drop over the length of the exhaust system.

Figure 5A:
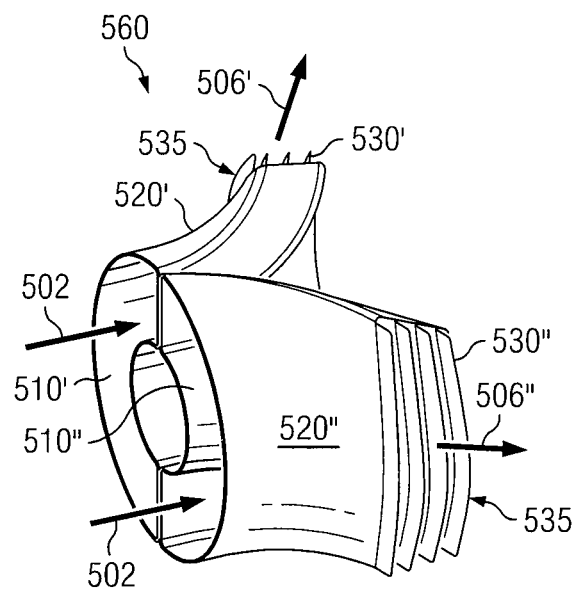
FIG. 5A shows an exhaust system according to one embodiment.
Figure 5B:
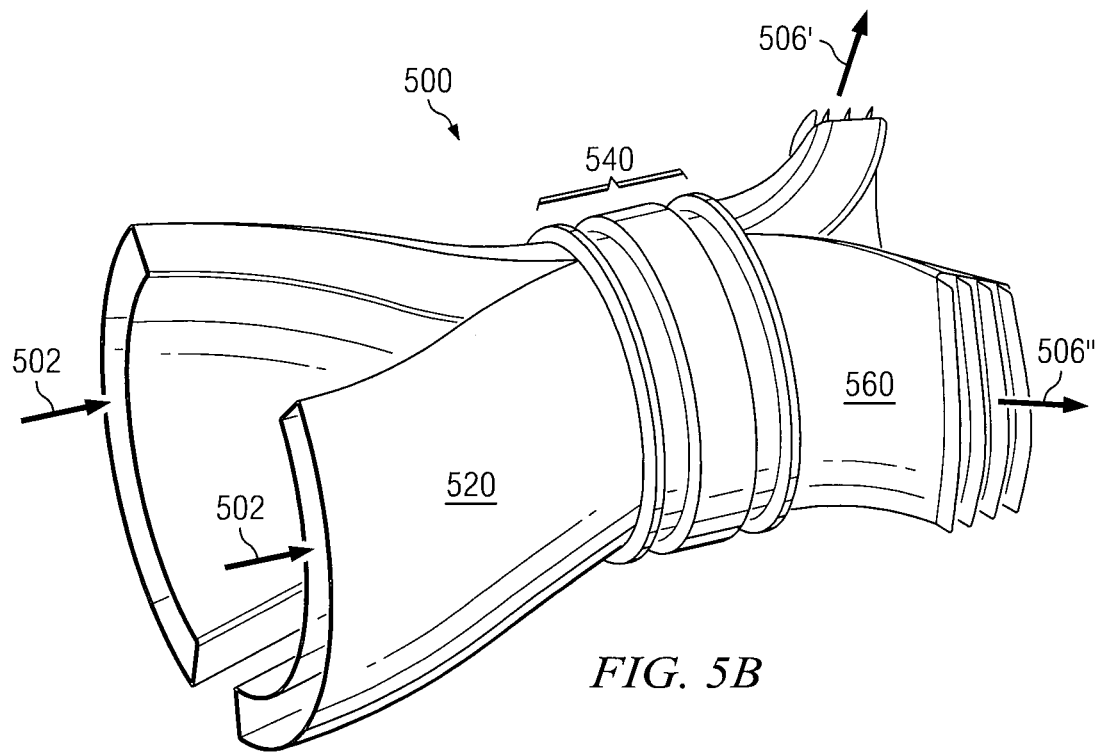
FIG. 5B shows the exhaust system of FIG. 5A incorporated into an inlet/exhaust system.
Figure 5C:
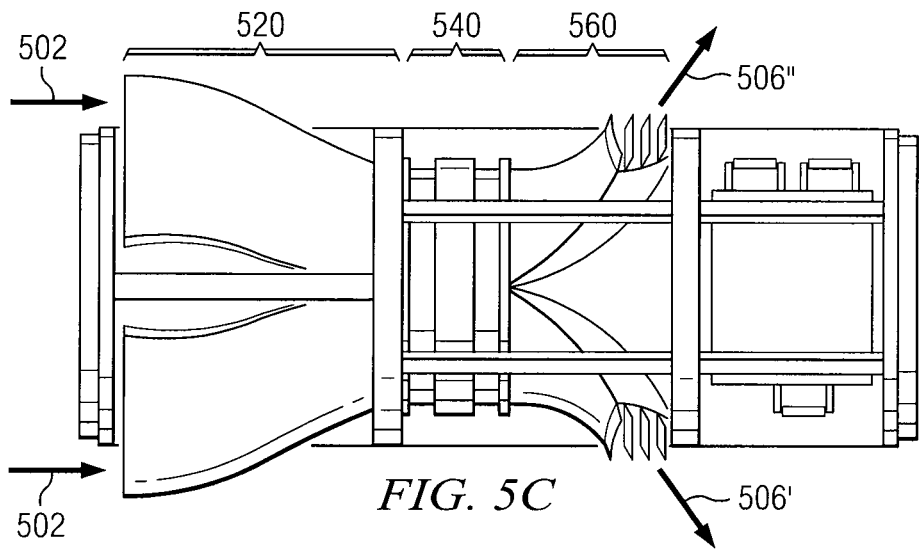
FIGS. 5C and 5D show the inlet/exhaust system of FIG. 5B incorporated into a vessel with the foreword and aft capsules removed.
Figure 5D:
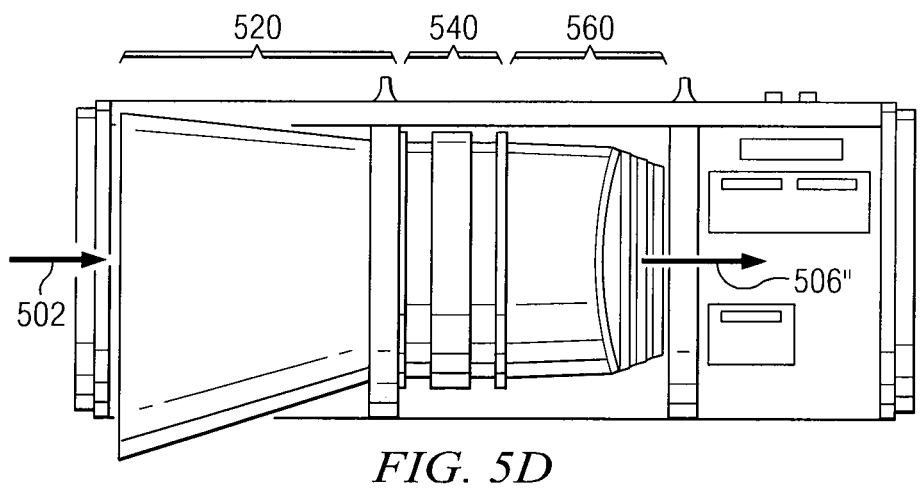

FIG. 5A shows an exhaust system 560 according to one embodiment. FIG. 5B shows the exhaust system 560 of FIG. 5A incorporated into an inlet/exhaust system 500. FIGS. 5C and 5D show the inlet/exhaust system of FIG. 5B incorporated into the vessel 100*b* with the capsules 104*b* and 106*b* removed. FIG. 5C shows a bottom interior view, and FIG. 5D shows a side interior view.

Inlet/exhaust system 500 features an inlet system 520, a mechanical device 540, and the exhaust system 560. Examples of the inlet system 520 and the mechanical device 540 may include, but are not limited to, the inlet systems 220 and 300 and the mechanical device 240, respectively.

Exhaust system 560 may feature a first incoming fluid duct 510', a second incoming fluid duct 510", a first fluid channel 520', a second fluid channel 520", a first outgoing fluid duct 530', and a second outgoing fluid duct 530". In some embodiments, the first and second incoming fluid ducts 510' and 510" may be configured to receive a first incoming fluid stream 502 traveling in a first direction.

First fluid channel 520' and second fluid channel 520" may be configured to communicate fluid from the first and second incoming fluid ducts 510' and 510" to the outgoing fluid ducts 530' and 530", respectively. In some embodiments, the outgoing fluid ducts may discharge fluid 506' and 506" in directions not parallel to the first direction. In some embodiments, the fluid 506' and 506" may be discharged perpendicularly to the first direction. Some embodiments may feature vents 535; teachings of certain embodiments recognize that vents 535 may redirect fluid 506' and 506" exiting the outgoing fluid ducts 530' and 530". For example, in one embodiment, the vents 535 are configured to redirect the fluid 506' and 506" towards a direction of an ambient air flow outside the vessel 100*b*.

In some embodiments, the openings of the exhaust system 560 may be flush with the outer surface of the vessel 100*b*. In some of these embodiments, vents 535 may be coupled to the openings and protrude out of the vessel 100*b*. Further, vents 535 may be of a variable geometry design to permit opening and closing of the fluid flow from the associated exhaust ducts.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A system comprising:
   an inlet system comprising:
   a first incoming fluid duct comprising a first opening configured to be disposed outside of a vessel and to receive a first incoming fluid stream in a first direction;
   a second incoming fluid duct comprising a second opening configured to be disposed outside of the vessel and to receive a second fluid stream in a second direction substantially parallel to the first direction;
   a first internal fluid duct configured to be disposed inside the vessel and to discharge internal fluid from the first and second incoming fluid streams in a third direction within the vessel, the third direction being substantially parallel to the first and second directions;
   a first fluid channel coupling the first incoming fluid duct outside the vessel to the first internal fluid duct such that the first incoming fluid stream is communicated to the first internal fluid duct;
   a second fluid channel coupling the second incoming fluid duct outside the vessel to the first internal fluid duct such that the second incoming fluid stream is communicated to the first internal fluid duct;
   a turbine disposed within the vessel, coupled to the first internal fluid duct, and configured to receive the internal fluid in the third direction; and
   an exhaust system comprising:
   a second internal fluid duct coupled to the turbine, configured to be disposed inside of a vessel and to receive internal fluid in the third direction froze the turbine;
   a first outgoing fluid duct having a first opening configured to be disposed outside of the vessel and to discharge a first outgoing fluid stream in a fourth direction;
   a second outgoing fluid duct having a second opening configured to be disposed outside of the vessel and to discharge a second outgoing fluid stream in a fifth direction;
   a third fluid channel coupling the second internal fluid duct inside the vessel to the first outgoing fluid duct such that at least a portion of the internal fluid is communicated to the first outgoing fluid duct;
   a fourth fluid channel coupling the second internal fluid duct inside the vessel to the second outgoing fluid duct such that at least a portion of the internal fluid is communicated to the second outgoing fluid duct; and a collector positioned between the turbine and the first and second outgoing fluid ducts, the collector configured to rotate fluid circumferentially around the collector in a direction perpendicular to the incoming fluid flow to increase the angular momentum of the fluid.

2. The system of claim 1, wherein
the vessel has a circular perimeter when viewed from a cross-section, and
the first opening and the second opening circumferentially extend around the circular perimeter.

3. A system comprising:
a first incoming fluid duct comprising a first opening configured to be disposed outside of a vessel and to receive a first incoming fluid stream in a first direction;
a second incoming fluid duct comprising a second opening configured to be disposed outside of the vessel and to receive a second fluid stream in a second direction substantially parallel to the first direction;
an outgoing fluid duct configured to be disposed inside the vessel and to discharge fluid from the first and second incoming fluid streams in a third direction within the vessel, the third direction being substantially parallel to the first and second directions;
a first fluid channel coupling the first incoming fluid duct outside the vessel to the outgoing fluid duct such that the first incoming fluid stream is communicated to the outgoing fluid duct;
a second fluid channel coupling the second incoming fluid duct outside the vessel to the outgoing fluid duct such that the second incoming fluid stream is communicated to the outgoing fluid duct; and
a collector that receives fluid passed through the outgoing fluid duct, the collector configured to rotate fluid circumferentially around the collector in a direction perpendicular to the incoming fluid flow to increase the angular momentum of the fluid.

4. The system of claim 3, wherein
the vessel has a circular perimeter when viewed from a cross-section, and
the first opening and the second opening circumferentially extend around the circular perimeter is not uniform.

5. The system of claim 3, the vessel comprising:
a forward capsule shaped according to an elliptical curve; and
a cylindrically-shaped body portion coupled to the forward capsule, wherein the first and second incoming fluid ducts are positioned near a transition between the elliptical curve and the cylindrically-shaped body.

6. The system of claim 3, the first and second fluid channels having respective body portions shaped according to a spline curve.

7. The system of claim 3, wherein the first direction is perpendicular to the cross-sectional plane of the first opening.

8. The system of claim 4, wherein the first opening is not flush with the outer surface of the vessel.

9. The system of claim 8, wherein the first opening is perpendicular to the outer surface of the vessel.

10. The system of claim 3, further comprising a turbine disposed within the vessel, coupled to the outgoing fluid duct, and configured to receive the discharged fluid.

11. The system of claim 3, wherein the first and second incoming fluid streams are ambient air streams.

12. An exhaust system, comprising:
an incoming fluid duct configured to be disposed inside of a vessel and to receive an incoming fluid stream in a first direction;
a first outgoing fluid duct having a first opening configured to be disposed outside of the vessel and to discharge a first outgoing fluid stream in a second direction, the first opening peripherally conforming to an outer surface of the vessel;
a second outgoing fluid duct having a second opening configured to be disposed outside of the vessel and to discharge a second outgoing fluid stream in a third direction, the second opening peripherally conforming to the outer surface of the vessel;
a first fluid channel coupling the incoming fluid duct inside the vessel to the first outgoing fluid duct such that at least a portion of the incoming fluid stream is communicated to the first outgoing fluid duct;
a second fluid channel coupling the incoming fluid duct inside the vessel to the second outgoing fluid duct such that at least a portion of the incoming fluid stream is communicated to the second outgoing fluid duct; and
a collector coupled between the incoming fluid duct and the first and second outgoing fluid ducts, the collector configured to rotate fluid circumferentially around the collector in a direction perpendicular to the incoming fluid flow to increase the angular momentum of the fluid.

13. The exhaust system of claim 12, wherein the vessel has a circular cross-sectional area between the first outgoing fluid duct and the second outgoing fluid duct.

14. The exhaust system of claim 12, the vessel comprising:
an aft capsule shaped according to an elliptical curve; and
a cylindrically-shaped body portion coupled to the aft capsule, wherein the first and second outgoing fluid ducts are positioned near a transition between the elliptical curve and the cylindrically-shaped body.

15. The exhaust system of claim 12, the first and second fluid channels having respective body portions shaped according to a spline curve.

16. The exhaust system of claim 12, wherein the first opening is not flush with the outer surface of the vessel.

17. The exhaust system of claim 16, wherein the first opening is perpendicular to the outer surface of the vessel.

18. The exhaust system of claim 12, wherein the first direction is parallel to the second direction.

19. The exhaust system of claim 18, wherein the second direction is parallel to a direction of an ambient air flow outside the vessel.

20. The exhaust system of claim 12, wherein the first opening and the second opening are flush with the outer surface of the vessel.

21. The exhaust system of claim 12, further comprising a plurality of vents coupled to the first outgoing fluid duct.

22. The exhaust system of claim 21, wherein the vents are configured to redirect the discharged fluid towards a direction of an ambient air flow outside the vessel.

23. The exhaust system of claim 12, further comprising a turbine disposed within the vessel, coupled to the incoming fluid duct, and configured to provide the incoming fluid stream.

* * * * *